Oct. 29, 1935.  W. S. SAUNDERS  2,019,159
SEAT ADJUSTING MECHANISM
Filed June 23, 1932    5 Sheets-Sheet 1
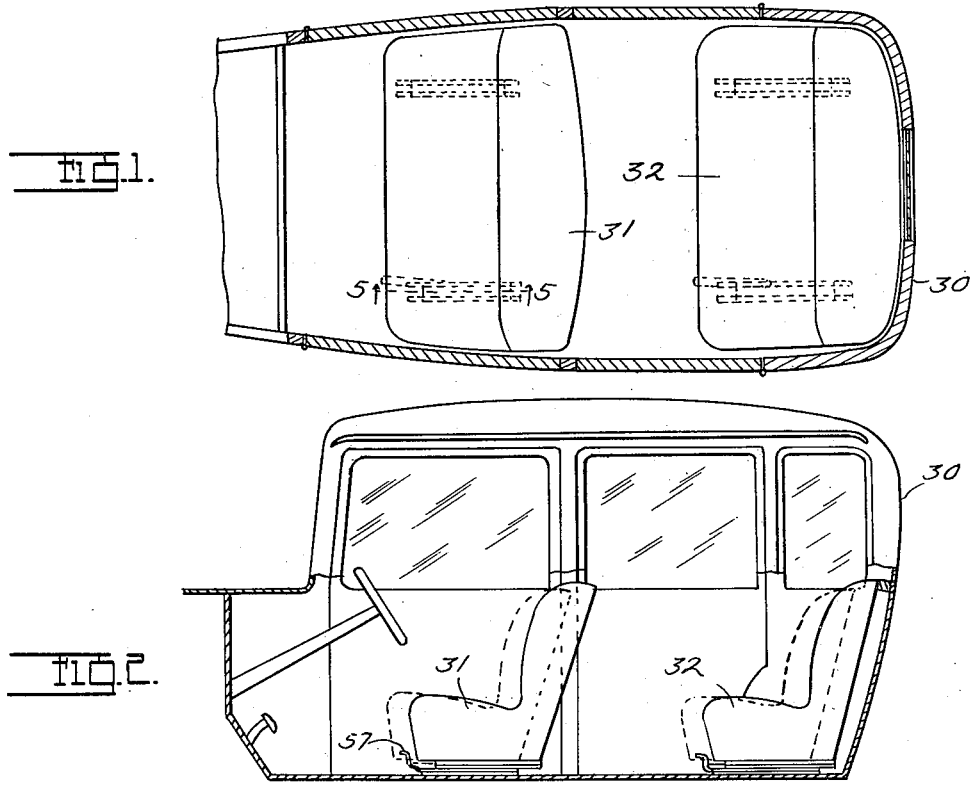
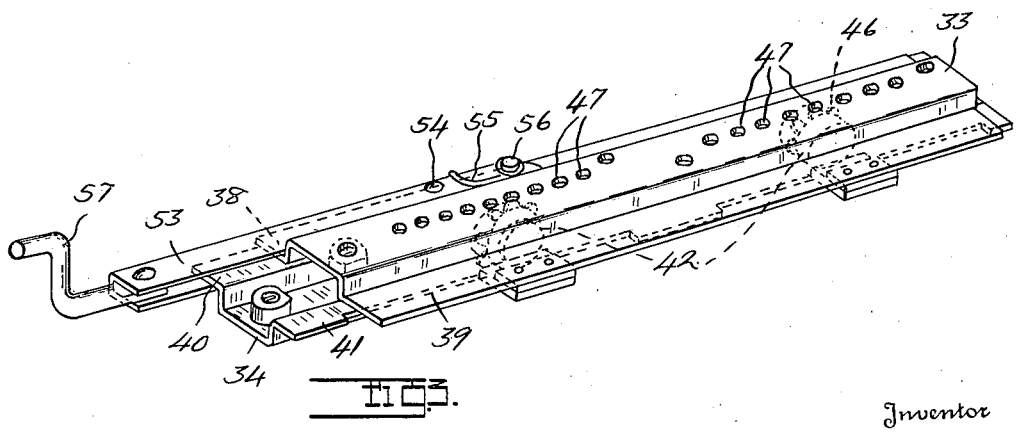
Inventor
Walter S. Saunders
By Swan, Frye & Hardesty
Attorneys

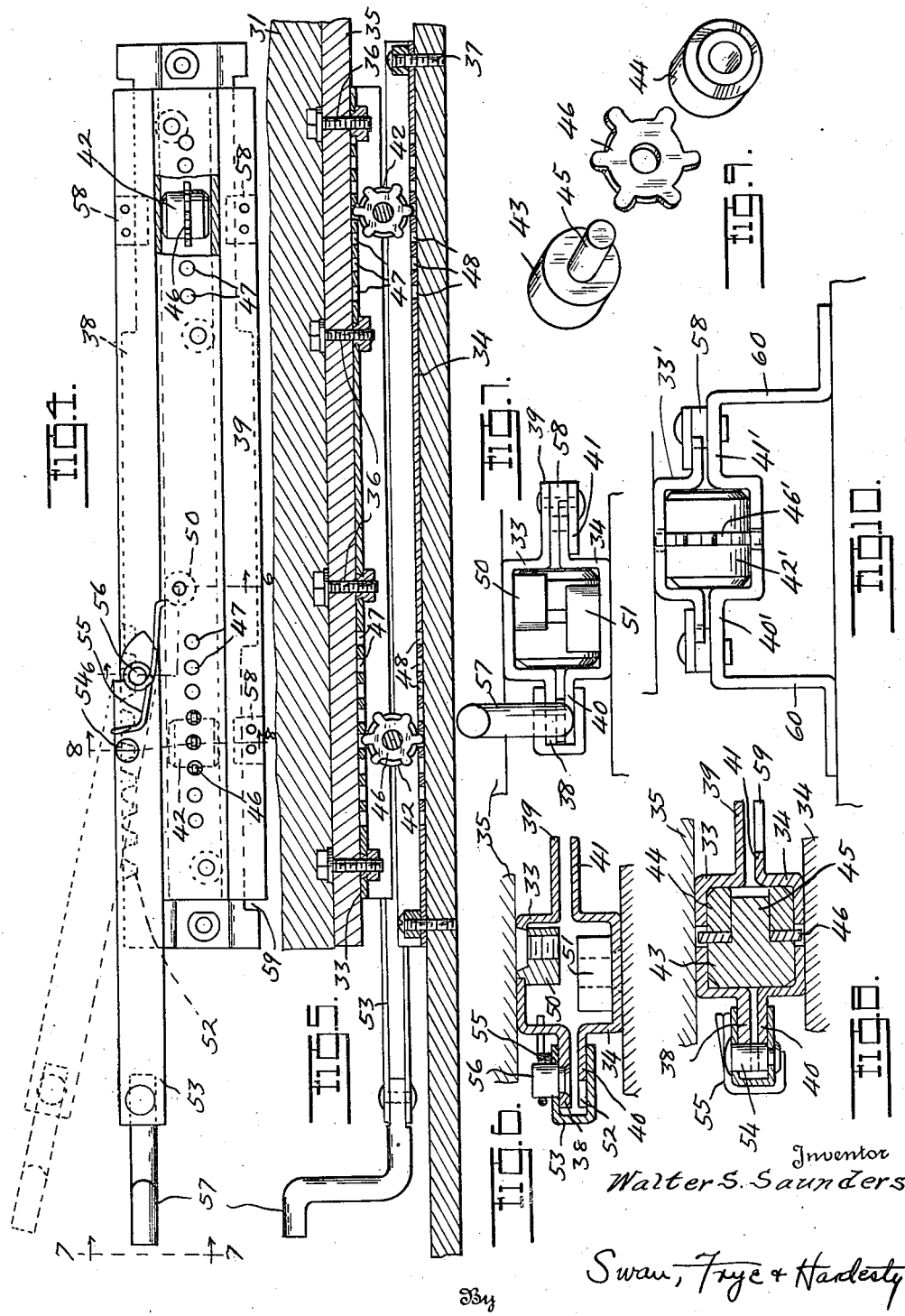

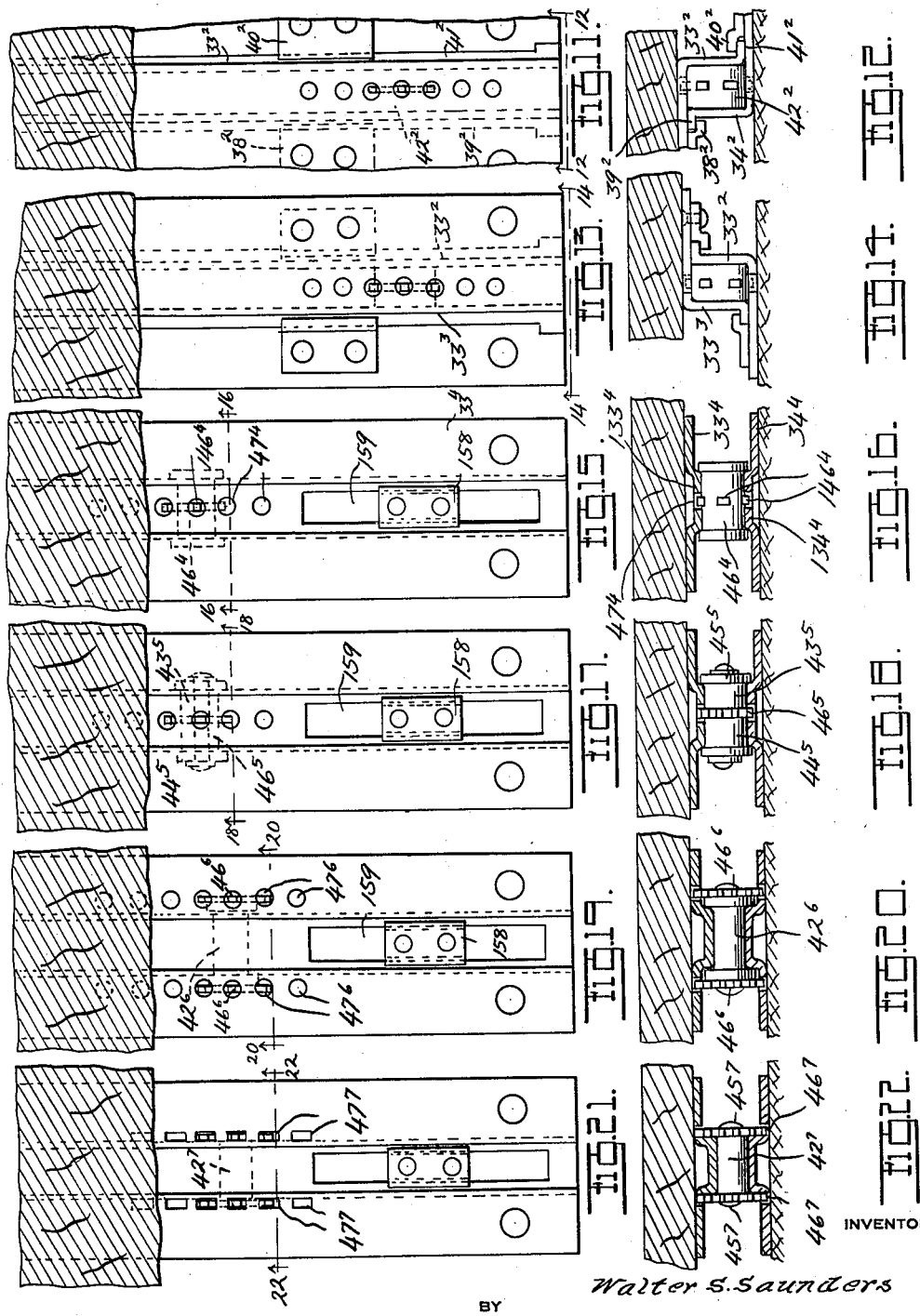

Oct. 29, 1935.   W. S. SAUNDERS   2,019,159
SEAT ADJUSTING MECHANISM
Filed June 23, 1932   5 Sheets-Sheet 4
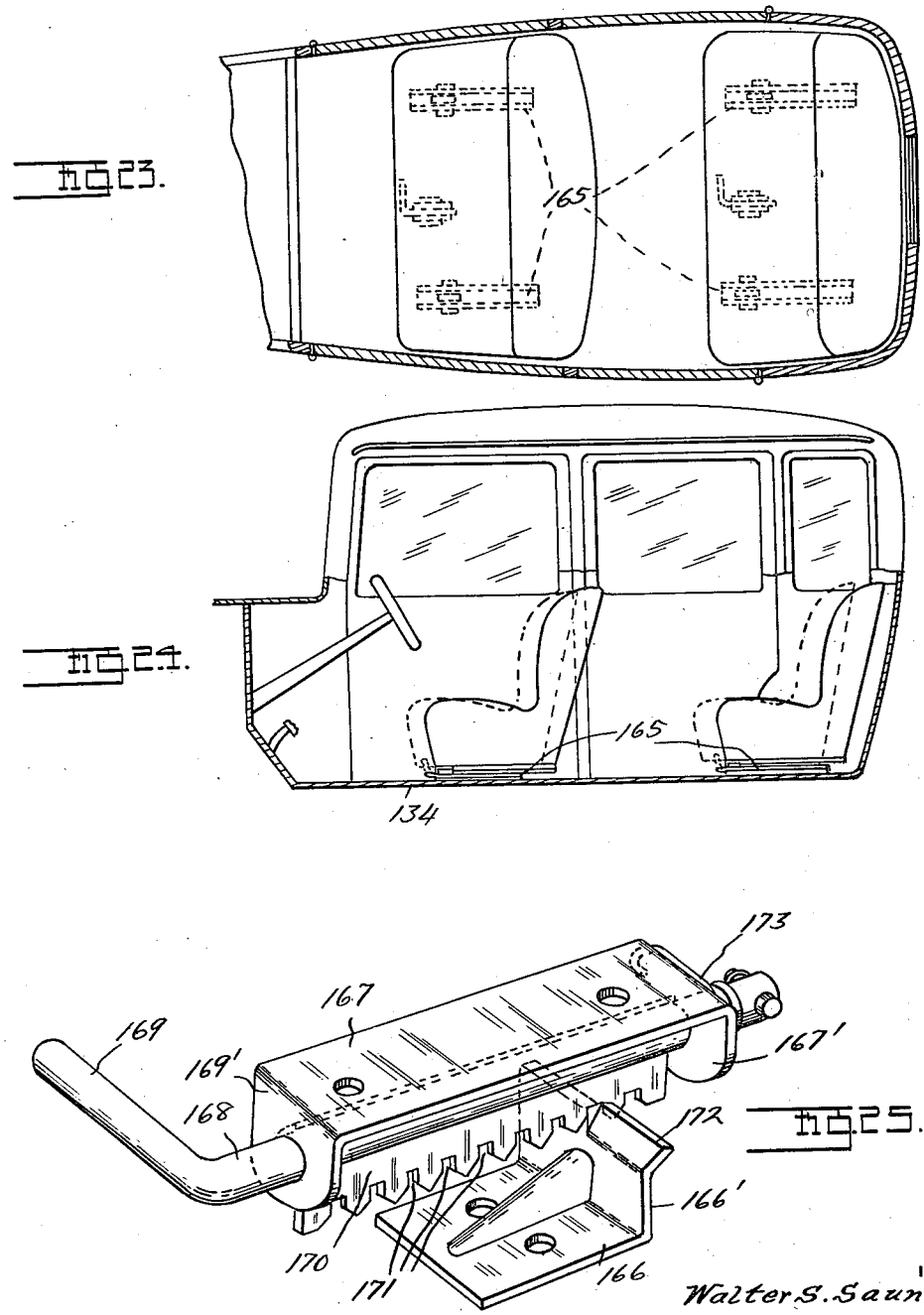
INVENTOR
Walter S. Saunders
BY
Swan, Frye + Hardesty
ATTORNEYS Oct. 29, 1935. W. S. SAUNDERS 2,019,159
SEAT ADJUSTING MECHANISM
Filed June 23, 1932 5 Sheets-Sheet 5
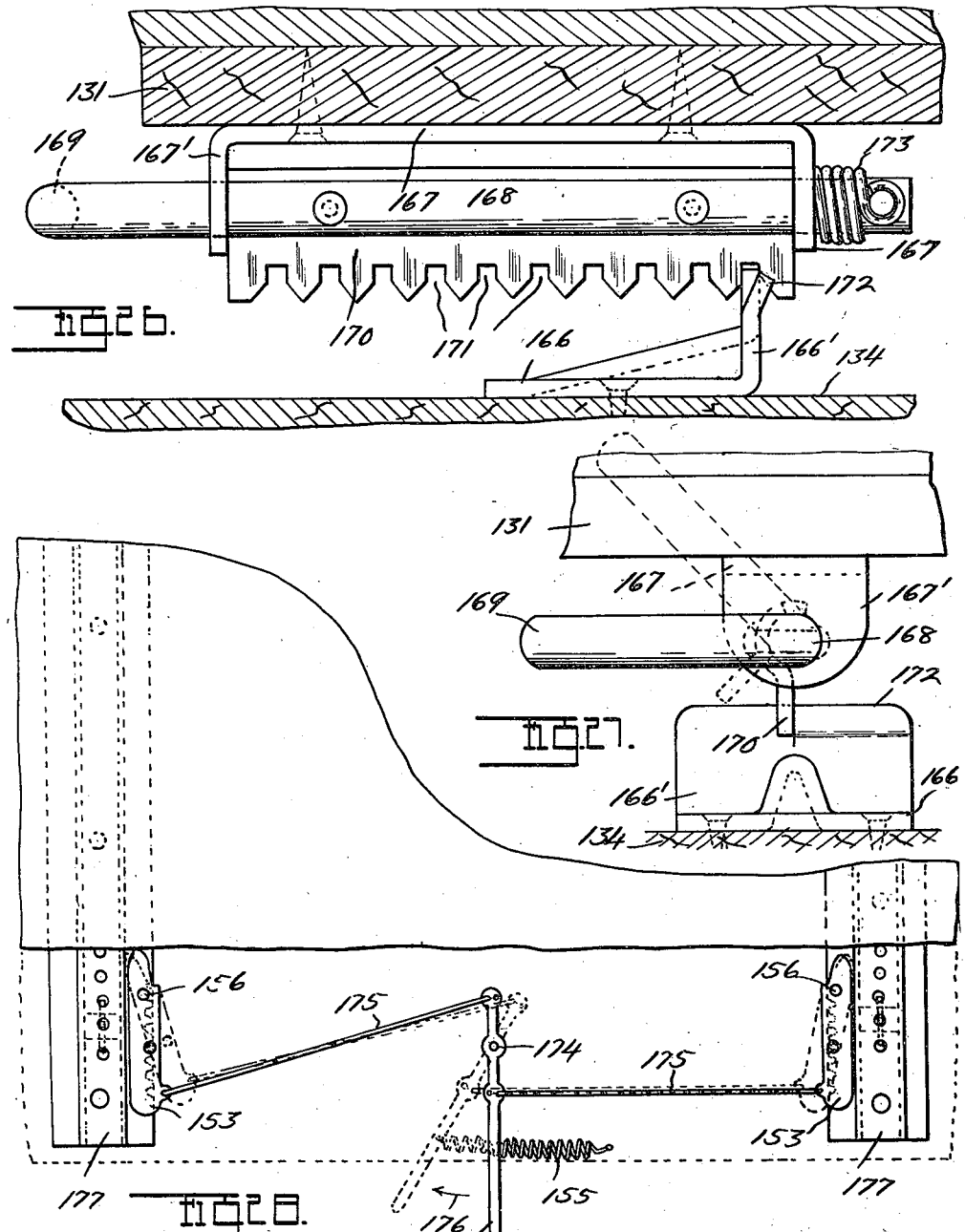
INVENTOR
Walter S. Saunders
BY
Swan, Frye + Hardesty
ATTORNEYS Patented Oct. 29, 1935

2,019,159

UNITED STATES PATENT OFFICE 2,019,159

SEAT ADJUSTING MECHANISM

Walter S. Saunders, Pontiac, Mich., assignor to
The American Forging and Socket Company,
Pontiac, Mich., a corporation of Michigan Application June 23, 1932, Serial No. 618,980

6 Claims. (Cl. 155—14)

This invention relates to seat adjusting mechanisms, and more particularly to improved devices adapted to slidably support the seats of vehicles as well as lock the same in desired positions, to enable adjustment of the positioning thereof to suit the comfort or convenience of different occupants. Among the important objects of this invention are the provision of such a seat adjusting mechanism which is of very simple and inexpensive yet rugged construction, works easily no matter what the load on the seat may be, and is easily manipulatable.

Another important object of this invention is the provision of such a seat adjusting mechanism incorporating simple but positive locking means preventing any possibility of movement of the seat except when the same is released by the operator.

Another object of the invention is the provision in such an adjusting device incorporating such positive locking means, of means whereby the locking mechanism may easily be released by the operator with the use of only one hand or foot, and whereby the locking mechanism immediately springs to locked position upon being released by the operator.

Still another object of my invention is the provision in such a seat adjusting mechanism of an improved anti-friction roller arrangement upon which the seat slides, which is so arranged that the rollers are held against displacement or an undesired degree of movement in a novel and effective manner, yet provide a practically frictionless support which enables easy sliding of the seat.

Other objects and advantages will be apparent from the following description wherein reference is made to the accompanying drawings illustrating preferred embodiments of my invention, and wherein similar reference numerals designate similar parts throughout the several views.

In the drawings:

Figure 1 is a simplified plan view, and Figure 2 a simplified side elevational view of the interior of a motor vehicle, the top and side of the vehicle respectively being broken away, showing seats mounted upon slidable supporting and adjusting mechanisms of my improved type;

Figure 3 is a perspective view of such a slidable seat support and locking mechanism incorporating in one form the principles of my invention;

Figure 4 is a top plan view thereof, with a part of the top plate broken away to afford a better view of one of the rollers;

Figure 5 is a vertical sectional view taken longitudinally through such a unit installed, fragmentarily showing a vehicle seat and floor and substantially corresponding to a section taken on the line 5—5 of Figure 1 and looking in the direction of the arrows;

Figure 6 is a sectional view taken substantially on the line 6—6 of Figure 4 and looking in the direction of the arrows;

Figure 7 is an end elevational view taken looking in the direction indicated by the line and arrows 7—7 of Figure 4;

Figure 8 is a detail sectional view taken substantially on the line 8—8 of Figure 4 and looking in the direction of the arrows;

Figure 9 is a perspective view of one of my improved roller assemblies showing the same disassembled;

Figure 10 is an end elevational view of a somewhat modified form of my invention;

Figures 11, 13, 15, 17, 19 and 21 are fragmentary plan views, similar to Figure 4, of various modified forms of roller mechanisms not incorporating locking devices;

Figures 12, 14, 16, 18, 20 and 22 are transverse sectional views, each taken substantially on the line designated by corresponding figures in the views immediately preceding, and looking in the direction of the arrows;

Figure 23 is a simplified plan view similar to Figure 1 of the interior of a vehicle incorporating slidable seat supports and locking mechanisms constructed according to a somewhat modified form of my invention;

Figure 24 is a side view of the interior of the body, similar to Figure 2;

Figure 25 is a perspective view of the modified locking mechanism incorporated in this form of my invention;

Figure 26 is a side elevational view of such locking mechanism installed, fragmentarily showing a vehicle seat and floor;

Figure 27 is an end view thereof taken looking toward the front of the seat, and Figure 28 is a plan view diagrammatically showing another somewhat modified form of my invention and the method of its installation.

Referring now to the drawings: Reference character 30 designates the closed body of a motor vehicle. Since the body construction forms no part of my invention, no attempt has been made to show or describe it in detail. That represented in the drawings is of the sedan type, having front and rear seats 31, 32 extending substantially entirely across the body. It has become increasingly common practice to provide means for adjusting the positioning of such seats forwardly and rearwardly, and particularly is it desirable to provide such adjusting means in connection with the front or driver's seat. My preferred mechanism for accomplishing this purpose incorporates therein means for so slidably supporting the adjustable seat or seats that when the inbuilt locking device is freed by moving a releasing lever, the seat is very easily slidable in either direction within the fixed limits, while when the operator releases the handle lever it immediately returns to locked position.

In the construction shown in Figures 3 to 10 inclusive, the device comprises upper and lower opposed channel members 33—34, the former of which is adapted to be secured to the bottom 35 of the seat 31, as by screws 36, (note Figure 5) while the latter may be similarly secured to the floor of the vehicle, as by screws 37. Each channeled member carries laterally extending marginal flanges 38, 39, 40, 41, while in the raceway formed by the opposed channeled portions are arranged roller members, generally designated 42, which are of such diameter that the channeled members, including their marginal flange portions, are thereby held slightly spaced from one another. In the form shown in these views, each unit incorporates two roller assemblies, each of which is divided into interfitting male and female portions 43—44, the former carrying the axially projecting pin 45 which the latter is bored to receive. Between the sections 43—44 and upon the pin 45 is arranged a toothed guide wheel 46. The root diameter of the toothed wheel 46 is preferably less than the diameter of the roller sections 43—44, so that it bears no weight, while the teeth project therefrom and engage a series of perforations 47—48 spaced correspondingly to the teeth in the upper and lower channeled members 33—34 respectively. The engagement of the teeth of the guide wheel 46 in the apertures will be seen to limit as well as insure the proper movement of the rollers, and to also prevent their displacement, without interfering with the freely rolling support which they provide between the channeled members 33—34. As best shown in Figures 6, 7 and 8, no sliding or rubbing engagement whatever is permitted between the channeled members, the rollers being of sufficient diameter to hold the flanges, as well as the body portions, spaced from each other. The seat is as a result very easily movable when the locking mechanism is released. Nuts 50—51 for engagement with the bolts 36—37 may be used instead of simple screw fastening means, secured in suitable apertures in the channeled members, as best shown in Figure 6.

Usually two such slidable seat supports comprising opposed channels and contained rollers are required to slidably support each seat, and with one or both may be incorporated locking means for preventing undesired relative sliding of the upper channel and so movement of the seat. One suitable method whereby such locking means may be provided is shown in Figures 3 to 8 inclusive, and comprises a series of locking or detent teeth 52 formed along one edge of one of the flanges, as the flange 40 carried by the lower member. Pivoted upon the opposite upper flange 38 is a lock-releasing lever 53 of U-like, channeled cross-section, the sides of which embrace the flanges 38—40, while a cross pin 54 carried thereby constitutes a locking or detent member adapted to engage the teeth 52 to prevent relative movement of the upper channeled member 33. The locking lever 53 is normally urged inwardly toward the full line position of Figure 4, in which the detent pin engages the teeth, by the torsion spring 55, wrapped about the pivot pin 56 of the locking lever and hooked at one extremity over the outer bight portion of the channeled lever, while its other extremity is hooked in an aperture in the side of the race member, as shown in Figure 4. The flange 38 of the upper race channeled member, to which the lever is pivoted, is of course notched in alignment with the pin 54, to permit sufficient inward movement of the pin and lever to allow the pin to engage in the spaces between detaining notches 52. The outer end of the releasing lever may carry an upwardly extending handle portion 57. It will be seen that by merely moving this lever, against the tension of the spring 55, to the position shown in dotted lines in Figure 4, the pin 54 may be moved to clear the detaining teeth or notches 52, thereby releasing the upper channel section and permitting free sliding movement of the seat. To limit the sliding movement of the upper and lower sections 33—34, as well as to hold them together, the retaining and stop blocks 58 carried by one of the flanges, here shown as the upper flange 39, may project into a slot 59 formed in the opposed lower flange 41, the edge of which they also overhang to prevent separation of the raceways. The ends of the slot serve to limit the movement of the upper section by engagement with the stop blocks.

In Figure 10 I have shown a somewhat modified construction in which the flanges 40'—41' of the lower section are elongated and bent downwardly to form supporting legs or brackets 60 adapted to somewhat raise the seat supported by the device from the floor. The construction of the upper channeled member 33' and the other portions of the device may be similar to that shown in connection with the first described embodiment, and equivalent portions of the mechanism will be seen to have been given like reference characters in this view, with the addition of prime exponents.

As shown in Figures 11 and 12, the upper and lower members $33^2$—$34^2$, which provide the races for the rollers, may be of angular rather than channel cross sectional form, and provided with flanges $39^2$—$41^2$ engaging in overhanging retainers $38^2$—$40^2$. The roller assembly, generally designated $42^2$, may be of similar form. In Figures 13 and 14 I have shown a similar but oppositely arranged mechanism to that shown in Figures 11 and 12, the parts of which are similarly designated, but with the use of cube instead of square exponents. It will be seen that one each of such units could be used, adjacent each end of a seat, and if desired the portions $33^2$—$33^3$ might be formed of continuous sheet metal stock.

In Figures 15 through 22 are shown embodiments of my invention incorporating variant roller constructions, in all of which, however, the rollers are retained by forming flanges upon their ends to give them a spool-like contour rather than by channeling the race members. In the embodiments shown in Figures 15 and 16, central guiding projecting teeth $146^4$ are formed integrally upon the middle of the spool-like roller $46^4$, while the upper and lower plates $33^4$—$34^4$ are formed each with a longitudinally extending ridge ($133^4$—$134^4$) adapted to engage the central cylindrical portion of the roller, and perforated as at $47^4$ for engagement with the guiding teeth 146⁴. The construction shown in Figures 17 and 18 is similar, but the roller 46⁵ is built up of three sections, comprising like end pieces 43⁵—44⁵ and an interposed toothed wheel 46⁵ secured together as by the headed pin or rivet 45⁵. In these embodiments the stop member limiting the relative travel of the upper and lower plates and preventing their separation comprises a stop block 158 centrally carried by the lower member and projecting through a longitudinally extending slot 159 in the central portion of the upper member, above which it is formed with overhanging edges.

In Figures 19 to 22 inclusive the guiding toothed portions are carried by the end flanges of the spool-like rollers, two such sets of toothed guides and cooperating perforations being used for each roller instead of one. In the embodiments shown in Figures 19 and 20 the toothed guide wheels 46⁶ are formed integrally upon the ends of the roller 42⁶, and engage two series of perforations 47⁶, one formed in each flange. In the embodiment shown in Figures 21 and 22 the toothed guide wheels 46⁷ are secured upon the ends of the cylindrical roller 42⁷ by riveting, as at 45⁷. Otherwise the construction will be seen to be similar to that of Figures 19 and 20, save for the use of rectangular rather than round guide perforations 47⁷, which is of course a matter of selection.

Rather than forming the locking mechanism and roller supporting mechanism as a unit, I may provide an independent locking device, which may be arranged beneath the middle of the seat if desired. This locking device may be independent of the slide members, which may be of any one of the constructions heretofore described. In Figure 23 the slidable supports are generally designated 165, and the locking device, shown best in Figures 25 to 27 inclusive, comprises a catch plate 166 secured as by screws to the floor 134 of the vehicle (note Figure 26), while to the underside of the baseboard of the seat 131 is secured a bracket 167 in whose downturned ends 167' is journaled a rod 168, the end of which is laterally bent as at 169 to form a handle, while its central portion, between the downturned ends of the bracket, rigidly carries another plate 170 projecting substantially radially therefrom, the slots 171 in which substantially conform in width to the thickness of the upturned edge 166' of the catch plate or bracket 166. When the toothed plate is in the position in which it is shown in Figures 25 and 26, and in full lines in Figure 27, so that one of the notches engages the straight portion of the upturned edge 166' of the catch plate 166, such engagement will be seen to prevent movement of the seat, while when the plate 170 is swung by means of the handle 169 to the position in which these members are shown in dotted lines in Figure 27, the plate 170 clears the catch plate, and so frees the seat to enable its sliding movement. A portion of the upturned edge 166' of the catch plate, as 172, is laterally bent to form an abutment preventing swinging of the plate 170 past vertical position in one direction, and the swinging plate is urged toward the abutment by the torsion spring 173, which acts upon the rod 168 and against the resistance of which the handle and plate are swung to released position. The spring of course serves to return the plate 170 to latching position as soon as the handle is released.

If it is desired to employ a locking mechanism of the type described in connection with the first embodiment, and still to utilize a centrally positioned releasing lever, suitable linkage mechanism may be provided for operating the mechanism by means of a centrally disposed lever. One such means is clearly illustrated in Figure 28, which shows two latching mechanisms, each having a shorter locking lever 153, one carried by the inner flanged portions of each slidable support. Each lever 153 must be pulled out about its fulcrum pin 156 to the dotted line position to release the locking mechanism, in a manner analagous to the operation of the handle lever 53 described in connection with Figures 4 and 5. The operating lever 157 is pivoted to the underside of the seat, as upon the pin 174, and to the lever upon opposite sides of the fulcrum are pivotally secured links 175, one extending and pivotally secured to each lever 153, in such manner that by moving the handle in the direction indicated by the arrow 176, to the dotted line position of Figure 28, the levers 153 are pulled laterally far enough to release the latching mechanisms and permit sliding of the seat. It is believed that the method of operation of this form of my invention will be clearly understood, since as shown in the drawings, the roller mechanisms, generally designated 177, may be constructed in a manner substantially identical to that shown and described in connection with the first embodiment. A single tension spring, as 155, acting upon the handle lever 157, may, if desired, be employed either in place of torsion springs of the type shown in connection with that embodiment, or to augment their effect.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. In apparatus for slidably supporting a seat and for locking the same in desired positions, in combination with oppositely positioned race members having interposed anti-friction bearing means, laterally projecting substantially parallel flanges carried by the race members and having adjacent free edges, locking means comprising a lever pivoted on one flange adjacent its edge, a locking detent portion carried by the lever, and a cooperating detent portion carried by the edge of the other flange and engageable by the detent portion of the lever.

2. In a sliding and locking seat support, in combination with a pair of opposed and relatively slidable channeled race members having interposed anti-friction means, a flange projecting from one side of one race member, a similarly projecting flange extending from the same side of the other race member, said flanges lying close to each other and having adjacent free edges, and locking means for preventing relative movement of the races comprising a channeled lever pivoted to one flange and adapted to fit over both flanges, and cooperating detent means carried by the lever and the other flange engageable and disengageable by movement of the lever.

3. In apparatus for slidably supporting a seat and for locking the same in desired positions, in combination with oppositely positioned sheet metal race members of flanged channel form, the channeled portions being arranged in opposed relation and the flanges adjacent each other, anti-friction bearing means interposed between said channeled portions, a locking portion carried by one flange, and a locking element movably supported by the adjacent flange and engageable and disengageable with respect to said locking portion.

4. In apparatus for slidably supporting a seat and for locking the same in desired positions, in combination with oppositely positioned sheet metal race members of channeled form and provided with marginal flanges arranged adjacent each other, anti-friction bearing means interposed between said channeled race portions, a locking element pivotally carried by one of said flange portions, and a plurality of abutment portions carried by the adjacent flange portion and engageable and disengageable by the locking element.

5. Apparatus as described in claim 4 characterized by the fact that the locking element comprises a sheet metal element folded to lie on opposite sides of said flange portions to prevent separation thereof.

6. In apparatus for slidably supporting a seat and for locking the same in desired positions, in combination with oppositely positioned sheet metal race members of channeled form and provided with marginal flanges arranged adjacent each other, bearing means interposed between said channeled race portions, a locking element pivotally carried by one of said flange portions, abutment means carried by the adjacent flange portion and engageable and disengageable by the locking element, said locking element comprising a sheet metal member folded to lie on opposite sides of said flange portions to prevent separation thereof when said element is in at least one position, and biasing means urging said element toward locked position.

WALTER S. SAUNDERS